US011360827B2

(12) United States Patent
Nguyen et al.

(10) Patent No.: US 11,360,827 B2
(45) Date of Patent: Jun. 14, 2022

(54) REGULATING CORE AND UN-CORE PROCESSOR FREQUENCIES OF COMPUTING NODE CLUSTERS

(71) Applicant: HEWLETT PACKARD ENTERPRISE DEVELOPMENT LP, Houston, TX (US)

(72) Inventors: Vincent Nguyen, Houston, TX (US); Robert Van Cleve, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 225 days.

(21) Appl. No.: 16/431,162

(22) Filed: Jun. 4, 2019

(65) Prior Publication Data

US 2020/0387409 A1 Dec. 10, 2020

(51) Int. Cl.
| | | |
|---|---|---|
| G06F 9/50 | (2006.01) | |
| G06F 9/38 | (2018.01) | |
| G06F 11/22 | (2006.01) | |
| G06F 1/324 | (2019.01) | |
| G06F 1/3293 | (2019.01) | |
| H04L 41/0806 | (2022.01) | |
| H04L 9/06 | (2006.01) | |
| H04L 41/0893 | (2022.01) | |

(52) U.S. Cl.
CPC ............ *G06F 9/5094* (2013.01); *G06F 1/324* (2013.01); *G06F 1/3293* (2013.01); *G06F 9/3891* (2013.01); *G06F 11/2284* (2013.01); *H04L 41/0806* (2013.01); *H04L 9/0643* (2013.01); *H04L 41/0893* (2013.01); *Y02D 10/00* (2018.01)

(58) Field of Classification Search
None
See application file for complete search history.

(56) References Cited

U.S. PATENT DOCUMENTS

| | | |
|---|---|---|
| 7,058,828 B2 | 6/2006 | Barr et al. |
| 7,134,031 B2 | 11/2006 | Flautner |
| 9,507,405 B2 | 11/2016 | Krishnaswamy et al. |
| 10,511,484 B1 * | 12/2019 | Yu ........................ H04L 41/0803 |

(Continued)

FOREIGN PATENT DOCUMENTS

WO    WO-2014160798    10/2014

OTHER PUBLICATIONS

Bright Computing, Inc., "Bright Cluster Manager 6.1: Administrator Manual," 2014, pp. 1-731.

(Continued)

*Primary Examiner* — Abu Zar Ghaffari
(74) *Attorney, Agent, or Firm* — Trop, Pruner & Hu, P.C.

(57) ABSTRACT

A technique includes receiving, by a cluster management controller, data representing results of a plurality of performance tests that are conducted on a plurality of processors that are associated with the plurality of computing nodes of a cluster. The technique includes, based on the data representing the results, selecting a lead processor of the plurality of processors; and communicating, by the cluster management controller, with the plurality of computing nodes to regulate core and un-core operating frequencies of the plurality of processors. Communicating with the plurality of computer nodes includes communicating data representing a core operating frequency of the lead processor and an un-core operating frequency of the lead processor.

17 Claims, 9 Drawing Sheets

(56) References Cited

U.S. PATENT DOCUMENTS

| | | |
|---|---|---|
| 2007/0074011 A1 | 3/2007 | Borkar et al. |
| 2007/0106622 A1 | 5/2007 | Boomershine et al. |
| 2008/0282102 A1 | 11/2008 | Reddy et al. |
| 2009/0144568 A1* | 6/2009 | Fung .................... G06F 1/3221 713/300 |
| 2011/0314312 A1 | 12/2011 | Naffziger et al. |
| 2012/0005513 A1 | 1/2012 | Brock et al. |
| 2012/0042176 A1 | 2/2012 | Kim |
| 2012/0079290 A1* | 3/2012 | Kumar ................. G06F 1/3228 713/300 |
| 2012/0159496 A1 | 6/2012 | Dighe et al. |
| 2013/0111236 A1* | 5/2013 | Ananthakrishnan ......................... G06F 1/3203 713/320 |
| 2014/0068290 A1* | 3/2014 | Bhandaru ............. G06F 1/3206 713/320 |
| 2014/0173297 A1* | 6/2014 | Varma .................... G06F 1/324 713/300 |
| 2014/0281610 A1 | 9/2014 | Biswas et al. |
| 2014/0281647 A1* | 9/2014 | Bodas .................. G06F 9/5094 713/340 |
| 2014/0380076 A1 | 12/2014 | Weissmann et al. |
| 2015/0006915 A1 | 1/2015 | Ganesan et al. |
| 2015/0135185 A1* | 5/2015 | Sirota .................. G06F 9/5011 718/103 |
| 2016/0077840 A1 | 3/2016 | Khatri |
| 2016/0147291 A1* | 5/2016 | Thomas ................ G06F 1/324 713/320 |
| 2017/0149554 A1* | 5/2017 | Gendler ............... H04L 7/0331 |
| 2017/0220362 A1 | 8/2017 | Jenne et al. |
| 2017/0344099 A1* | 11/2017 | Qu ....................... G06F 9/4401 |

OTHER PUBLICATIONS

Greg Semararo et al., "Dynamic Frequency and Voltage Control for a Multiple Clock Domain Microarchitecture," Nov. 2002, pp. 1-12, University of Rochester, NY.

U.S. Appl. No. 16/194,017, filed Nov. 16, 2018; 28 pp.

* cited by examiner

REGULATING CORE AND UN-CORE PROCESSOR FREQUENCIES OF COMPUTING NODE CLUSTERS

BACKGROUND

The performances of processors (e.g., central processing unit (CPU) packages) that have the same stock keeping unit (SKU) may vary, and the processors may run at different operating frequencies, even if the processors are each set to the same power consumption limit. A relatively less efficient or relatively more leakage prone processor may be forced to lower its operating frequency, as compared to a more efficient processor when running at the same power consumption limit.

For a server that performs a complex processing job involving multiple processors, it may be beneficial for the processors of the server to have similar performances, as threads that finish tasks slower may add to the total duration for finishing the job. Techniques such as binning and cherry picking may be used to select processors that have similar performances.

DETAILED DESCRIPTION

Figure 1:
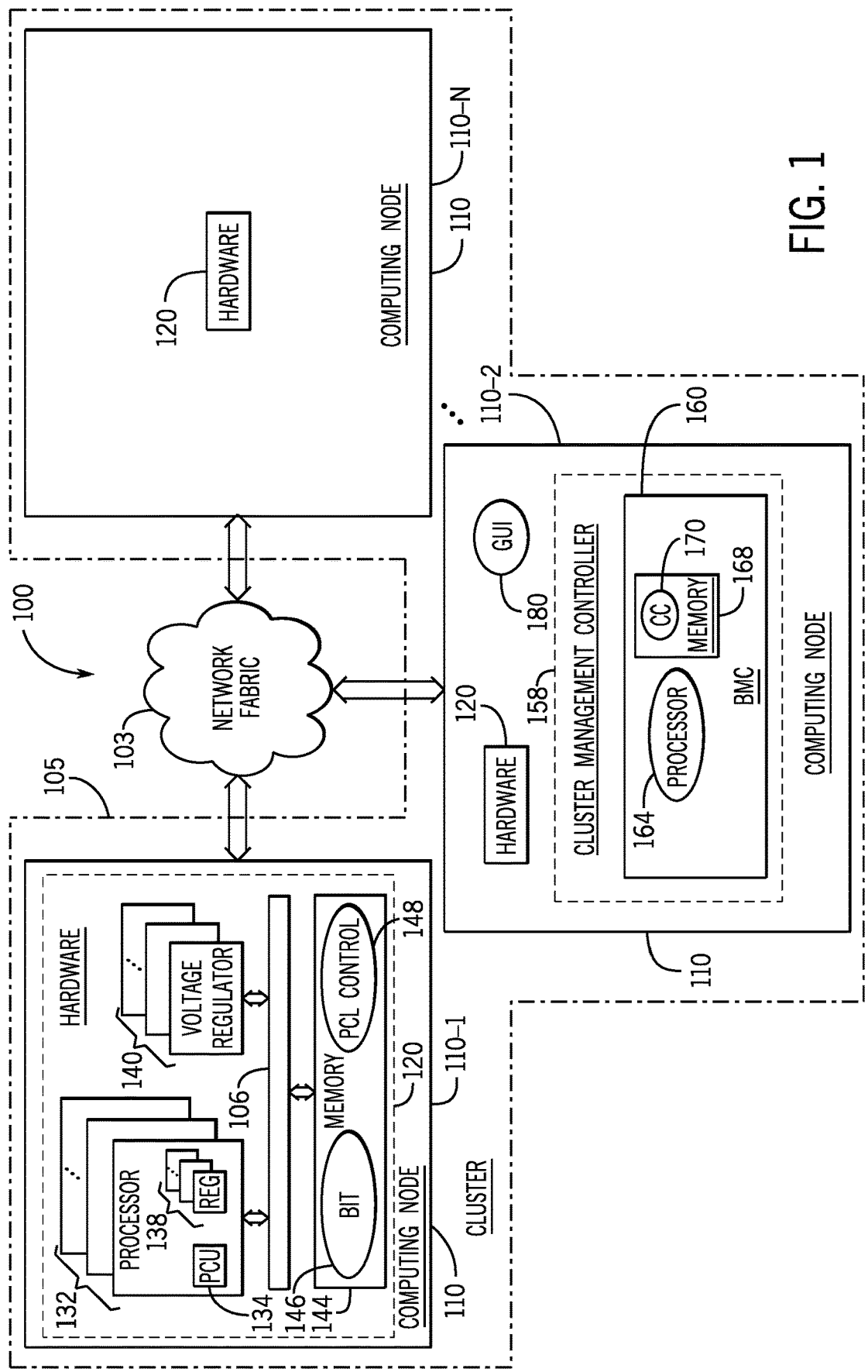
FIG. 1 is a schematic diagram of a computer system including a cluster of computing nodes according to an example implementation.

A cluster of computing nodes (a cluster of servers, for example) may perform inter-related tasks related to achieving a common goal. As examples, a cluster of computing nodes may execute tasks to perform a computing-intensive processing job (e.g., a seismic imaging job involve computationally complex inversion computations); perform parallel processing; perform query processing; execute a distributed application; and so forth. Each of the computing nodes of the cluster may include multiple "processors." In this context, a "processor" refers to a semiconductor package (i.e., a "chip") that contains one or multiple processing cores (e.g., central processing unit (CPU) processing cores). As examples, a "processor" may be a CPU semiconductor package, a graphics processing unit (GPU) semiconductor package, a network processing unit (NPU) semiconductor package, and so forth.

Due to the sophisticated tasks and interaction among the processors of the cluster, it may be beneficial for all of the processors of the cluster to have operating frequencies that are essentially the same. In this context, operating frequencies of two processors may be considered to be "essentially the same" when the operating frequencies are within one percent or less of each other. If the operating frequencies are not essentially the same, some processors of the cluster may wait on other processors to finish particular tasks, resulting in slower overall processing speed for the cluster.

The processor may have two operating frequencies: a core operating frequency and an un-core operating frequency. In this context, a "core operating frequency" (or "core frequency") of the processor refers to the frequency at which instructions are executed by the processing cores (e.g., CPU processing cores) of the processor. In this manner, the core operating frequency refers to the frequency at which the processing cores of the processor perform arithmetic and logic operations that involve processing core registers. An "un-core operating frequency" (or "un-core frequency") refers to the frequency that is associated with non-processor core circuitry of the processor, such circuitry involved in transferring data from processing core registers to a last level cache (LLC), operations performed by a memory controller of the processor, and so forth.

A processor may have an associated nominal core operating frequency and a nominal un-core operating frequency when the processor is running at its nominal power consumption limit. However, in practice, the processor may have an actual power consumption limit that varies (slightly above, for example) with respect to its nominal power consumption limit; and the core and un-core operating frequencies of the processor may deviate from the nominal core and un-core operating frequencies when the processor is running at the nominal power consumption limit. Therefore, even though processors of a cluster of computing nodes may be selected, which have the same nominal power consumption limits and same nominal operating frequencies, in practice, considerable differences may be observed among the processors.

In general, the overall performance of the cluster may be adversely affected if the core operating frequencies of the processors of the cluster are not essentially the same and if the un-core operating frequencies of the processors of the cluster are not essentially the same. Slower processor threads finish tasks slower, adding to the total duration for finishing complex jobs that involve multiple processors with multiple computing nodes of the cluster.

Binning and cherry picking are possible approaches that may be used to select the processors of the cluster for purposes of matching the core and un-core operating frequencies of the processors. However, these approaches may be rather costly to implement. Moreover, these approaches do not consider that different processors may age differently, and accordingly, the core and un-core operating frequencies among processors that are selected using binning or cherry picking may diverge over time.

In accordance with example implementations that are described herein, a cluster controller selects a "lead processor" of a cluster of computing nodes; and the cluster controller instructs the other processors (i.e., the non-lead processors) of the cluster to set their core and un-core operating frequencies to the core and un-core operating frequencies of the lead processor. In this context, the "lead processor" refers to a selected processor, whose core and un-core operating frequencies serve as the standard, or goal, for the cluster, such that the core and un-core operating frequencies of the non-lead processors are adjusted (as described herein) to be essentially the same as the respective core and un-core frequencies of the lead processor. This approach may be relatively less expensive than binning or cherry picking; and moreover, this approach accommodates aging of the processors and may be used repeatedly over time to adjust the core and un-core operating frequencies as the processors age, servers of the cluster are replaced or added, and so forth.

The core and un-core frequencies of a processor are related to the processor's power consumption limit. In accordance with example implementations, a power control unit (PCU) of the processor controls the core operating frequency of the processor based on a sensed power consumption versus core operating frequency relationship; and the PCU controls the un-core operating frequency of the processor based on a sensed power consumption versus un-core operating frequency relationship. In general, the PCU increases the core and un-core operating frequencies of the processor with the processor's power consumption limit, so that when running at a full load, the processor operates at or near the power consumption limit at a particular core operating frequency and at a particular un-core operating frequency.

In accordance with example implementations, as further described herein, the PCU of the processor may be placed in a mode of operation, which allows an adjustment to be made to the power consumption versus core operating frequency relationship that is sensed by the PCU; and this adjustment allows the power consumption limit that is defined by this relationship to be adjusted to set the core operating frequency to a particular value. In a similar manner, in accordance with example implementations, an adjustment to be made to the power consumption versus un-core operating frequency relationship that is sensed by the PCU; and this adjustment allows the power consumption limit that is defined by this relationship to be adjusted to set the un-core operating frequency to a particular value. As such, the core and un-core operating frequencies of each of the non-lead processors may be adjusted, or tuned, to be essentially the same as the respective core and un-core operating frequencies of the lead processor.

In accordance with some implementations, the adjustments of the core and un-core frequencies, as described herein, may result in the actual power consumption of the processor to slightly exceed the maximum, or peak, power consumption rating (e.g., the thermal design power (TDP) rating) of the processor. For example, the manufacturer design guidelines for the processor may state that the tolerance may be ±3%, and the actual power consumption of the processor may exceed the TDP rating by 3% or less. If the imbalance between the actual power consumption and the maximum power consumption rating is due to board or voltage regulation variances, then the actual power consumption may not actually exceed the maximum power consumption rating. However, if the imbalance could be due to the processor having more leakage-type power losses, and for this case, the actual power consumption may slightly exceed the maximum power consumption rating. In accordance with example implementations, the adjustments to the core and un-core frequencies, as described herein, do not exceed the guidance given by the processor manufacturer design documentation. However, technically the total wattage could exceed the maximum power consumption rating (e.g., exceed the rated TDP). Moreover, in accordance with example implementations, the core and un-core of the processor are not overclocked, as the core and un-core frequencies remain below the fused maximum settings of the processor.

The empirical data that provides the knowledge to allow adjustments of the core and un-core operating frequencies may be acquired in burn-in tests of the individual processors when their associated computing nodes boot up or are reset. More specifically, in accordance with example implementations, as part of a Power-On Self-Test (POST), a boot processor of the computing node executes firmware instructions that cause the boot processor to communicate with all processors of the node for purposes of performing burn-in tests of the processors. In the burn-in test for a particular processor, the slope of the power consumption to core frequency relationship that is sensed by the PCU of the processor is incrementally adjusted; and each slope value and the resulting core operating frequency of the processor are recorded. In a similar manner, the slope of the power consumption to un-core frequency relationship that is sensed by the PCU of the processor is incrementally adjusted in the burn-in test; and each slope value and the resulting un-core operating frequency of the processor are recorded. This process may result in rebooting the computing node several times, in accordance with example implementations.

As part of the burn-in tests, the individual performances of the processors of the computing node may also be evaluated, resulting in the determination of a performance metric for each processor. In accordance with example implementations, the computing nodes communicate (via in-band or out-of-band communication channels) the processor performance metrics for all of the processors to the cluster management controller. Moreover, in accordance with example implementations, the core operating frequency and un-core operating frequency for each processor is communicated to the cluster management controller. The cluster management controller then selects the lead processor based on the performance metrics.

More specifically, in accordance with some implementations, the cluster management controller may select the lead processor to be the highest performing processor (as indicated by the performance metrics), although the cluster management controller may select the lead processor based on other and/or additional criteria, in accordance with further implementations. After selection of the lead processor, the cluster management controller may then instruct all of the processors of the cluster to set their core and un-core operating frequencies to the same respective frequencies as the lead processor; and for this purpose, the appropriate slope values may be used to adjust, or tune, the core and un-core operating frequencies of each processor to the respective core and un-core operating frequencies of the lead processor.

The above description assumes that all of the computing nodes of the cluster are homogenous, i.e., all of the computing nodes have certain characteristics that are the same, such as processor types and memory configurations that are shared in common. As further described herein, in accordance with some implementations, measures may be undertaken to detect and accommodate scenarios in which not all of the computing nodes of the cluster are homogenous. For example, a subset of computing nodes of the cluster may be homogenous and have the same processor types and memory configurations, whereas other computing nodes of the cluster do not. As another example, the cluster may be divided into multiple groups of computing nodes, with the computing nodes of each group being homogenous but having different processor types and memory configurations than the computing nodes of other groups. As another example, the cluster may be divided into groups of homogenous computing nodes, and a remaining set of computing nodes may not be homogenous.

In accordance with example implementations, for purposes of the cluster management controller evaluating which computing nodes may be grouped together, the cluster management controller considers configuration identifying hash values that are determined by the computing nodes and communicated to the cluster management controller. More specifically, in accordance with some implementations, each computing node may calculate a hash value based on a configuration (a processor types, a memory configuration, and so forth) of the computing node and communicate this hash value to the cluster management controller. In this way, the cluster management controller may identify a homogeneous group of the computing nodes (i.e., the computing nodes that have the same hash value), select a lead processor from this group, and set the core and un-core operating frequencies of the processors of the group to be essentially the same. If there is, for example, another group within the cluster of computing nodes that have another hash value that is shared in common, the cluster management controller may likewise select a lead processor from this group and set the core and un-core processor operating frequencies of this other group to be essentially the same as the selected lead processor for the group.

As a more specific example, FIG. 1 is a schematic diagram of a computer system 100 in accordance with some implementations. Referring to FIG. 1, the computer system 100 may include a cluster 105 of computing nodes (N example computing nodes 110-1 . . . 110-N being depicted in FIG. 1). As an example, the computing nodes 110 may be respective servers, although the computing nodes may be formed from entities other than servers, in accordance with further implementations.

In accordance with example implementations, the computing nodes 110 may communicate over network fabric 103. In general, the network fabric 103 may include components and use protocols that are associated with any type of communication network, such as (as examples) Fibre Channel networks, iSCSI networks, ATA over Ethernet (AoE) networks, HyperSCSI networks, local area networks (LANs), wireless networks, wide area networks (WANs), global networks (e.g., the Internet), or any combination thereof.

In general, in accordance with example implementations, the computing nodes 110 operate in conjunction to perform different tasks of a shared goal, such as the execution of a distributed application, the processing of database queries, a computing intensive operation, parallel processing, and so forth. Regardless of the particular tasks that are performed by the computing nodes 110 as part of the cluster 105, it may be beneficial for processors of the computing nodes 110 to operate at essentially the same core operating frequencies and operate at essentially the same un-core operating frequencies.

FIG. 1 depicts components of a specific computing node 110-1, with it being understood that other computing nodes 110 may have a similar design. The computing node 110, among its other features, may include hardware 120, such as multiple processors 132, multiple voltage regulators 140 and a memory 144. In accordance with example implementations, the processor 132 may include a power control unit (PCU) 134 that controls the core and un-core operating frequencies of the processor 132 based on the processor's power consumption. In particular, in accordance with example implementations, the PCU 134 senses the power consumption of the processor 132 and controls the core and un-core operating frequencies of the processor 132 in response thereto so that, in general, the core and un-core operating frequencies of the processor 132 increase with the processing load that is placed on the processor 132.

In response to PCU 134 sensing that the processing load is at or near its maximum, the PCU 134 clips, or limits, the core and un-core operating frequencies of the processor 132 to limit the total power consumption of the processor 132. For example, in accordance with some implementations, the PCU may clip, or limit, the core and un-core operating frequencies as follows when the PCU 134 senses that the power consumption limit has been reached. The PCU 134 may first limit the un-core operating frequency for a certain amount of time for purposes of accommodating relatively short-term power consumption increases; and eventually, the PCU 134 may clip the core operating frequency to regulate the long-term power consumption of the processor 132. When operating at or near a full processing load, the processor 132 operates at or near the processor's power consumption limit; and at this power consumption limit, the processor has an associated core operating frequency and an associated un-core operating frequency.

Even though their nominal power consumption limits and associated core and un-core operating frequencies may be the same, in practice, the processors 132 have different maximum core and un-core operating frequencies. Moreover, the power consumption limits for the processors 132 may vary with respect to their nominal power consumption limits.

In accordance with example implementations, a cluster management controller 158 of the cluster 105 selects one of the processors 132 to be a "lead processor" and communicates with the other processors 132 of the cluster 105 to set the core and un-core operating frequencies of these other processors 132 to the respective core and un-core operating frequencies of the lead processor 132. For the specific example implementation that is depicted in FIG. 1, the cluster management controller 158 may be, for example, a baseboard management controller (BMC) 160. In general, a BMC is a service processor that performs management related activities for a computer system (here, the cluster 105) and may communicate with a BMC dashboard for purposes of allowing an administrator to monitor and control various systems of the computer system. For the cluster 105, the management related activities include managing the core and un-core operating frequencies for the processors 132 of the cluster 105. In accordance with example implementations, the cluster management controller 158 may use an out-of-band communication channel for communications between the cluster management controller 158 and the computing nodes 110. In accordance with further example implementations, the cluster management controller 158 and the computing nodes 110 may communicate via in-band management channels.

For the specific example implementation of FIG. 1, the BMC 160 communicates with a graphical user interface (GUI) 180, which serves as a BMC dashboard. FIG. 1 depicts the GUI 180 as being disposed on the same computing node 110-2 as the BMC 160. In accordance with further example implementations, the GUI 180 may be disposed on another computing node 110 of the cluster 105, as well as possibly on a computing node outside of the cluster 105.

Although FIG. 1 depicts the cluster management controller 158 as including a BMC, the cluster management controller 158, in accordance with further example implementations, may not be or include a BMC. In this manner, in general, the cluster management controller 158 may be a dedicated computer node, may be a dedicated processor, may be formed by a dedicated thread, processing core, or processing of a computing node, and so forth.

In accordance with example implementations, each processor 132 may be on its own voltage plane, which is set by a supply voltage that is provided by one of the voltage regulators 140. The hardware 120 may further include a bus 106 over which the processors 132, the voltage regulators 140 and the memory 144 communicate. In general, the bus 106 may include one or more of a data bus, a control bus, a system bus, a power management bus, an Inter-Integrated Circuit (I²C) bus, a telemetry bus, and so forth. Moreover, the memory 144 may represent volatile as well as non-volatile memories and may be formed from a combination of non-transitory memory storage devices (semiconductor storage devices, memristors, phase change memory devices, a combination of storage devices selected from more than one of these storage technologies, and so forth).

In accordance with example implementations, the cluster management controller 158 relies on performance measurements that are conducted on the processors 132 (at bootup or after reset, for example) for purposes of selecting one of the processors 132 as the lead processor for the cluster 105 or, as further described herein, selecting a lead processor for a particular group of processors 132 of the cluster 105. As an example, in accordance with some implementations, at the time of bootup or reset of a given computing node 110, burn-in tests may be performed on the processors 132 of the computing node 110 for purposes of measuring slope values that correspond to specific core and un-core frequencies of the processor 132, as further described herein. As an example, these measurements may be conducted in response to firmware being executed by a boot processor 132 and may be performed as part of a POST that is executed by the boot processor 132. FIG. 1 depicts burn-in test machine executable instructions 146 (i.e., software, such as firmware) that may be stored in the memory 144 and executed by a boot processor 132 of a particular computing node 110 during the bootup or reset of the computing node 110.

In general, each processor 132 includes registers 138 that may be used to read statuses and control operations of the processor 132, such as, reading a power consumption of the processor 132; setting a ratio, or slope, of a power consumption to core operating frequency of the processor 132; setting a power consumption to un-core operating frequency ratio, or slope, of the processor 132; programming the PCU 134 to operate in a mode of operation that allows slope values associated with the core and un-core operating frequencies to be changed; allow an average core operating frequency of the processor 132 to be read; allow an average un-core operating frequency of the processor 132 to be read; and so forth.

In accordance with example implementations, during the burn-in test, the boot processor 132 may program (via register 138 writes) the PCU 134 of each processor with different power consumption to core operating frequency ratios, or slopes. As further described herein, for each of the slope values, the processor 132 has a different effective power consumption limit and a corresponding core operating frequency. Accordingly, during the burn-in test for a particular processor 132, a set of slope values and the corresponding core operating frequencies for a processor 132 may be determined. In a similar manner, during the burn-in test, the PCU 134 may be programmed (via register writes 138) with different slopes, or ratios, for the power consumption versus un-core frequency relationship that is sensed by the PCU 134. Accordingly, as a result of these different slope values, a set of slope values and the corresponding un-core operating frequencies for a processor 132 may be recorded. As such, at the conclusion of the burn-in test for a processor 132, a set of core frequency-associated slope values and a set of un-core frequency-associated slope values are recorded so that the PCU 134 for a given processor 132 may later be programmed to adjust, or tune, the core and un-core operating frequencies of the processor to the core and un-core frequencies of a lead processor 132.

As also part of the burn-in test, in accordance with example implementations, a performance test may be conducted for each processor 132. For purposes of the performance test, maximum processing loads may be placed on the processor 132 and observations may be made when the processor 132 begins to limit, or clip, the core and/or un-core operating frequencies. In this manner, in the performance test, a minimum delay value may be determined for the processor 132. The minimum delay value represents the minimum delay between successive processing loads at which the processor 132 does not clip the core and un-core operating frequencies. This minimum delay value, in turn, may serve as a performance metric value for the processor 132 (i.e., smaller delay values are associated with relatively higher performing processors 132).

In accordance with example implementations, the boot processor 132 of the computing node 110 may communicate the measured delay values and the associated core and un-core operating frequencies to the cluster management controller 158. Based on these delay values, which serve as the performance metrics, the cluster management controller 158 may then select one of the processors 132 to be the lead processor for the cluster 105.

In this manner, in accordance with some implementations, the cluster management controller 158 may select the processor that has the lowest delay value (i.e., the highest performance processor 132) to be the lead processor. However, in accordance with other implementations, the cluster management controller 158 may apply other criteria in selecting the lead processor based on the delay values, such as, for example, selecting the lead processor based on the mean minimum delay value. Regardless of the criteria that is applied, a processor 164 of the cluster management controller 158 may execute cluster controller instructions 170 that are stored in a memory 168 for purposes of selecting the lead processor and then communicating requests to the computing nodes 110 for the processors 132 of each computing node 110 to set their respective core and un-core operating frequencies to be the same as the lead processor 132. In this manner, in accordance with example implementations, a particular processor 132 of the computing node 110, such as the boot processor 132, may execute power consumption limit control instructions 148, which cause the processor 132 to use the previously determined power consumption to slope values to adjust or tune, the core and un-core operating frequencies of the processors 132 of the computing node 110 to the requested values.

Figure 2:
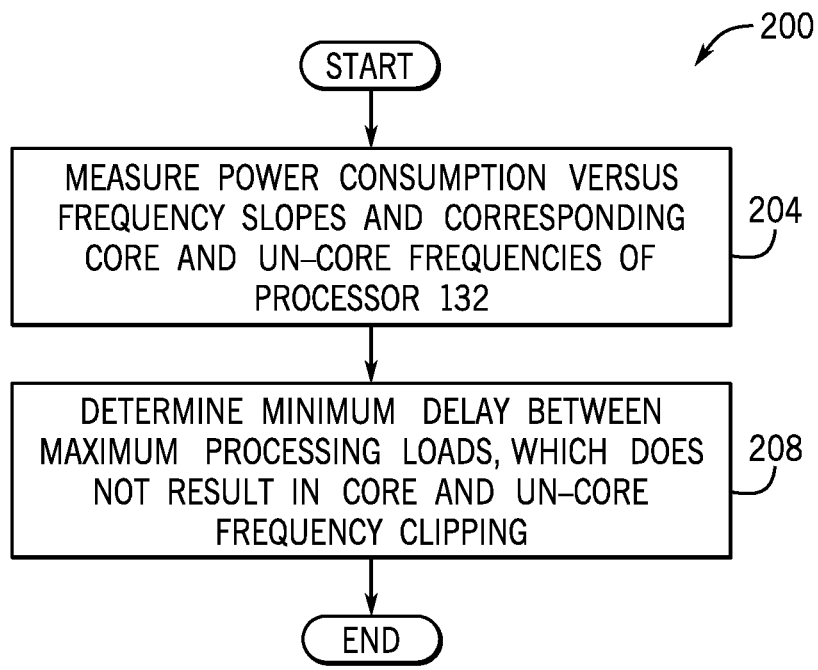
FIG. 2 is a flow diagram depicting a burn-in test associated with a processor of FIG. 1 according to an example implementation.

FIG. 2 depicts a process 200 for conducting a portion of a burn-in test associated with measuring the slope values for a particular processor 132. It is noted that the process 200 may be performed, for example, by a boot processor 132 of a particular computing node 110 and may be used by the boot processor 132 for each processor of the computing node 110. Referring to FIG. 2 in conjunction with FIG. 1, pursuant to the process 200, for each processor 132, a measurement is made (block 204) of the power consumption versus frequency slopes and the corresponding core and un-core frequencies of the processor 132. Data representing these relationships may be stored, or recorded, for example, in the memory 144. The process 200 also includes determining (block 208), for the processor 132, a minimum delay value between maximum processing loads, which does not result in core and un-core frequency clipping.

Figure 3:
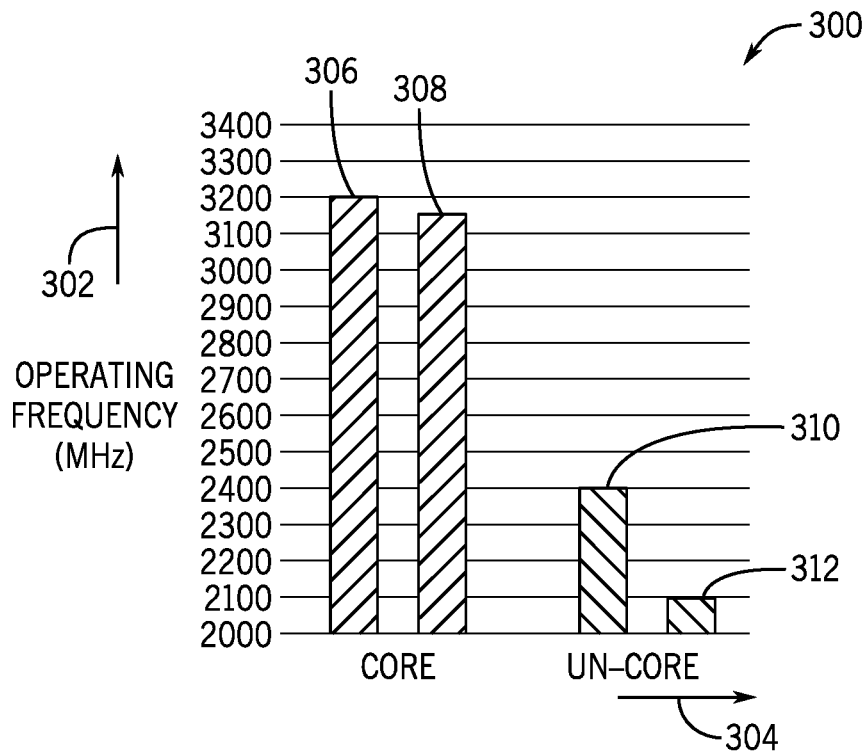
FIG. 3 illustrates core and un-core operating frequencies of two processors that run at the same power consumption limit according to an example implementation.

FIG. 3 is a graph 300 illustrating exemplary core and un-core operating frequencies of two processors that are set to run at the same power consumption limit, in accordance with example implementations. FIG. 3 depicts frequency on a vertical axis 302 and a type of operating frequency (core or un-core) on a horizontal axis 304. As depicted in FIG. 3, the two core frequencies 306 and 308 of the two processors 132 are unequal, with the core frequency 306 being at 3200 Mega Hertz (MHz) and being higher than the core frequency 308, which is at 3170 MHz. Thus, with regards to un-core operations, the processor 132 that is associated with the core frequency 306 is more efficient, as compared with the processor 132 that is associated with the core frequency 308.

FIG. 3 also depicts un-core operating frequencies 310 and 312 of the same two processors 132. As shown, the two un-core operating frequencies 310 and 312 are unequal, with the un-core operating frequency 310 being at 2400 MHz and higher than the un-core operating frequency 312, which is at 2100 MHz. Thus, with regards to un-core instructions, the processor 132 that is associated with the un-core operating frequency 310 is more efficient, as compared with the processor 132 that is associated with the un-core operating frequency 312.

Through the slope adjustments, the core and un-core frequencies of two processors 132, such as the processors whose core and un-core frequencies are depicted in FIG. 3, may be adjusted to make the core frequencies essentially the same and make the un-core frequencies essentially the same. For the specific example of FIG. 3, the adjustments may be made to increase the core frequency 308 from 3170 MHz to 3200 MHz and increase the un-core frequency 312 from 2100 MHz to 2400 MHz to match the core 306 and un-core 310 frequencies.

Referring back to FIG. 1, in accordance with example implementations, the instructions 146 may further cause the boot processor 132 to calculate a hash value, which represents a configuration of its computing node 110. In general, the hash value represents a configuration of the computing node 110. In this manner, the hash value may be computed based on a processor type, a memory configuration, and so forth, of the computing node 110. For example, there may be twenty different potential processor configurations (i.e., having integers of "1" to "20") and ten different memory configurations (i.e., configurations having integers of "1" to "10"); and correspondingly, the number that is input to the hash function may be derived from a combination (a concatenation or other combination) of these two (or possibly more) components to produce an input to the hash function. Application of a hash function produces a value that, if the input is only slightly changed, the resulting hash value is different. Therefore, by all of the computing nodes 110 generating a corresponding hash value, the cluster management controller 158 may readily recognize which computing nodes 110 are the same, or are homogeneous, and which computing nodes 110 are different. In this manner, in accordance with some implementations, not all of the computing nodes 110 of the cluster 105 may be the same, and the cluster management controller 158 sets the core and un-core operating frequencies of like, or similar, computing nodes 110 of the cluster 105 to be the same. It is noted that initially, a given cluster 105 may be entirely homogeneous. However, during the lifetime of the cluster 105, computing nodes 110 associated with evolving technologies may be added, other computing nodes may be used to replace existing computing nodes 110, and so forth.

Figure 4:
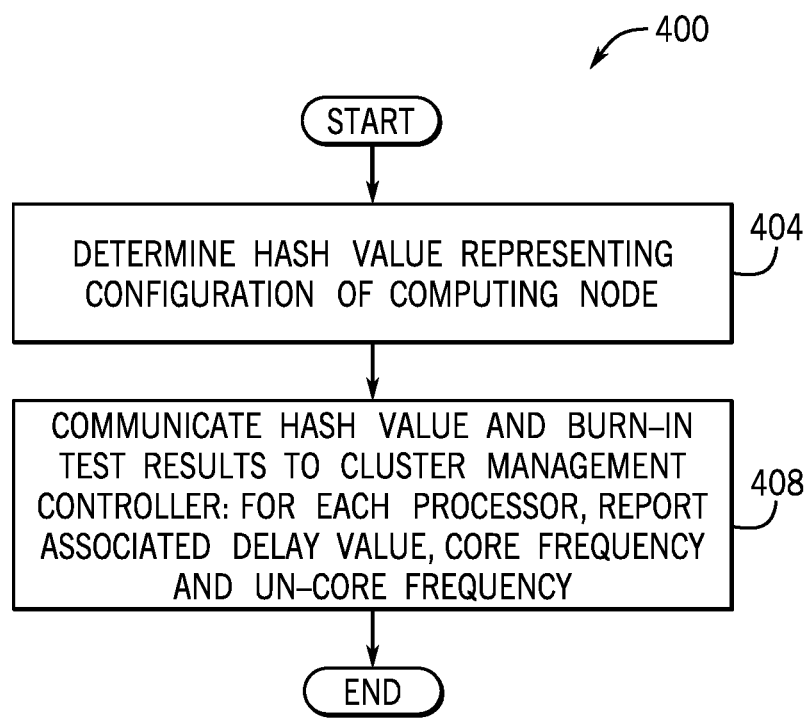
FIG. 4 is a flow diagram depicting actions taken by a computing node of the cluster of FIG. 1 after bootup or reset of the node according to an example implementation.

Referring to FIG. 4, in accordance with some implementations, the boot processor 132 may perform a technique 400. Referring to FIG. 4 in conjunction with FIG. 1, pursuant to the technique 400, the processor 132 determines (block 404) a hash value representing a configuration of the computing node 110 that contains the processor 132. The processor 132 then communicates (block 408) the hash value for the computing node and the burn-in test results to the cluster management controller 158. In this manner, for each processor 132 of the computing node 110, the processor 132 may report its associated delay value, core frequency and un-core frequency.

Figure 5:
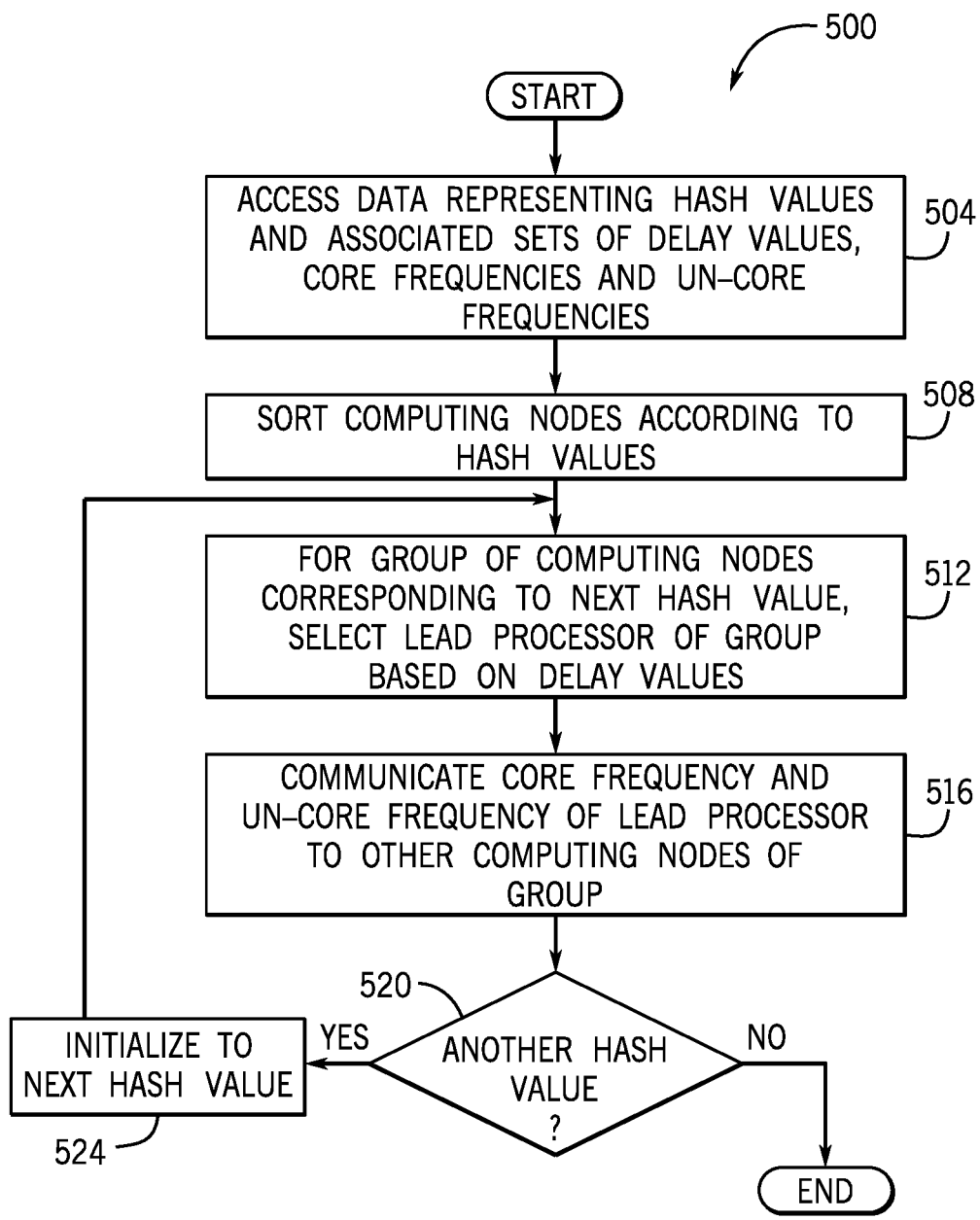
FIG. 5 is a flow diagram depicting a process performed by a cluster management controller of FIG. 1 to set core and the un-core operating frequencies of processors of a group of computing nodes of the cluster to be essentially the same according to an example implementation.

FIG. 5 depicts an example technique 500 that may be performed by the cluster management controller 158, in accordance with example implementations. Pursuant to the technique 500, the cluster management controller 158 accesses (block 504) data representing hash values and associated sets of delay values, maximum core frequencies and maximum un-core frequencies. The cluster management controller 158 may sort (block 508) the computing nodes 110 according to the hash values. In this manner, in accordance with example implementations, the cluster management controller 158 may group computing nodes 110 that share the same hash value into the same group.

Blocks 512, 516, 520 and 524 pertain to the cluster management controller's processing of each group. More specifically, pursuant to block 512, the cluster management controller 158 determines, for a group of computing nodes corresponding to a particular hash value, a lead processor 132 of the group based on the delay values. For example, in accordance with some implementations, the cluster management controller 158 may select the processor 132 that has the smallest delay value to be the lead processor 132 for the group. After selecting the lead processor 132, the cluster management controller 158 may then communicate (block 516) the maximum core frequency and the maximum un-core frequency of the lead processor to the computing nodes 110 of the group. If, pursuant to decision block 520, there is another hash value (i.e., another group) to process, then the cluster management controller 158 initializes (block 524) to the next hash value and proceeds to block 512 to process the other group.

Figure 6:
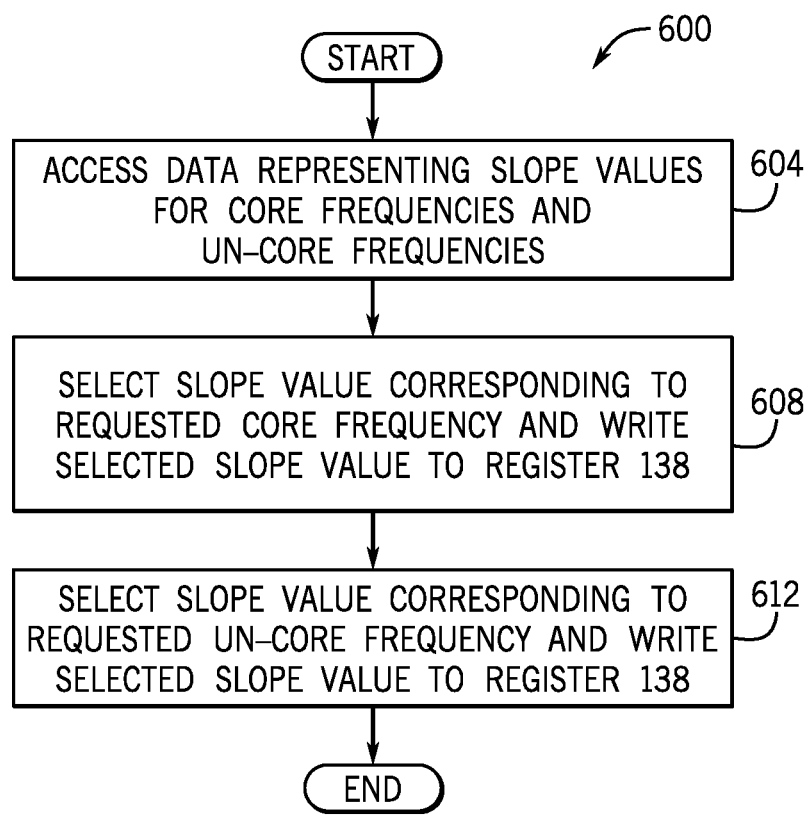
FIG. 6 is a flow diagram depicting a process to set core and un-core operating frequencies of a processor of the cluster of FIG. 1 according to an example implementation.

FIG. 6 depicts a process 600 that may be applied by a given computing node 110 in response to receiving requested core and un-core frequencies from the cluster management controller 158, in accordance with example implementations. As an example, the boot processor 132 of the computing node 110 may perform the process 600. The process 600 may be performed for purposes of adjusting the core and un-core operating frequencies of each processor 132 of the computing node 110. Referring to FIG. 6 in conjunction with FIG. 1, pursuant to the process 600, data representing the slope values for the core and un-core frequencies are accessed pursuant to block 604. Next, the slope value corresponding to the requested core frequency is selected and written to the appropriate register 138 of the processor 132, as depicted in block 608. Moreover, the process 600 includes the slope value corresponding to the requested un-core frequency being selected and written to the appropriate register 138 of the processor 132, pursuant to block 612.

Figure 7A:
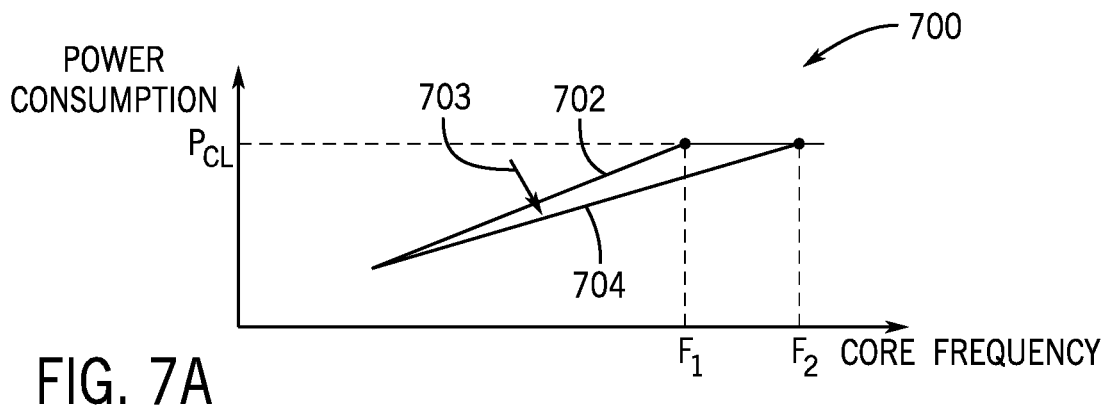
FIGS. 7A and 7B depict power consumption versus core frequency slope adjustments to alter a core operating frequency of a processor according to an example implementation.

FIG. 7A is an illustration 700 depicting how the PCU 134 may be adjusted to control the core operating frequency of the processor 132, in accordance with some implementations. More specifically, FIG. 7A depicts an existing power to core frequency relationship 702 sensed by the PCU 134. The PCU 134 may, however, be placed in a mode of operation that allows a write to the appropriate register 138 to set the slope of this relationship. As depicted in FIG. 7A, the processor 132 has a power consumption limit (called "PcL") such that the core frequency increases linearly with power consumption until the power consumption limit PCL is reached, and for greater frequencies, the core frequency is clipped by the PCU 134 to limit the power consumption to the PCL limit. For purposes of effectively increasing the core operating frequency of the processor 132, the processor 132 may write to a register 138 of the processor 132 to place the PCU 134 in a mode of operation, which allows the power consumption to core operating frequency that is sensed by the PCU 134 to be adjusted. In this manner, in this mode of operation, a slope of the initial power consumption to core operating frequency relationship 702 (having a core frequency $F_1$) may be decreased to produce a relationship 704 that produces a higher core frequency $F_2$. In other words, if the requested core operating frequency $F_2$ is greater than the current core operating frequency of the processor 132, the slope may be decreased, as depicted by arrow 703 in FIG. 7A, to increase the core frequency.

Figure 7B:
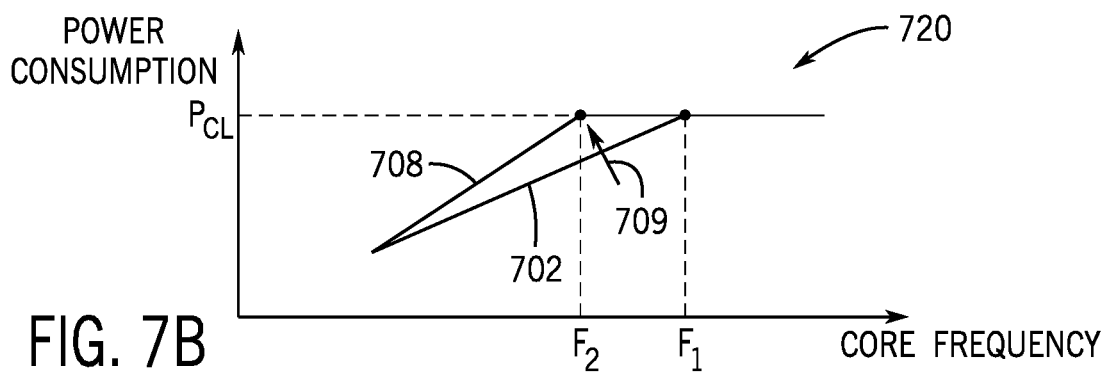

If the requested core operating frequency $F_2$ is below, or less than, the actual core operating frequency $F_1$ of the processor 132, then the slope may be increased, as depicted in illustration 720 of FIG. 7B. In this regard, the slope of the relationship 702 is increased, as represented by arrow 709, to cause the power consumption to core operating frequency to have a relationship 708 in which the maximum core operating frequency $F_2$ is now less than the original core operating frequency $F_1$.

In a similar manner, the processor 132 may write to a register 138 with a corresponding slope value to upwardly or downwardly adjust the un-core operating frequency of the processor 132.

Figure 8A:
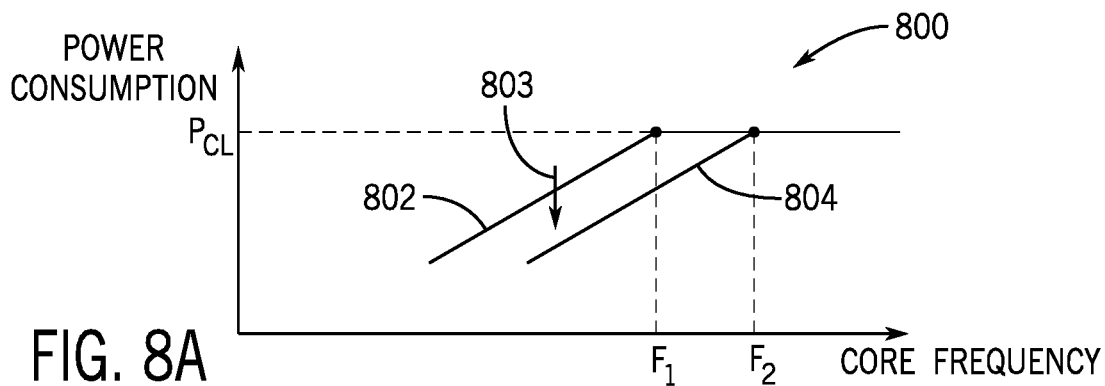
FIGS. 8A and 8B depict power consumption versus core frequency offset adjustments to alter a core operating frequency of a processor according to an example implementation.

In accordance with further example implementations, a slope value may be written to a register 138 to place the PCU 134 in a mode of operation that allows the offset of the power consumption to core operating frequency relationship to be adjusted to manipulate the core operating frequency. In this manner, FIG. 8A is an illustration 800 depicting a negative offset being added to downwardly shift (as depicted by arrow 803) a power consumption to core operating frequency relationship 802 (having a core operating frequency $F_1$) to produce a new relationship 804 that has a higher core frequency $F_2$.

Figure 8B:
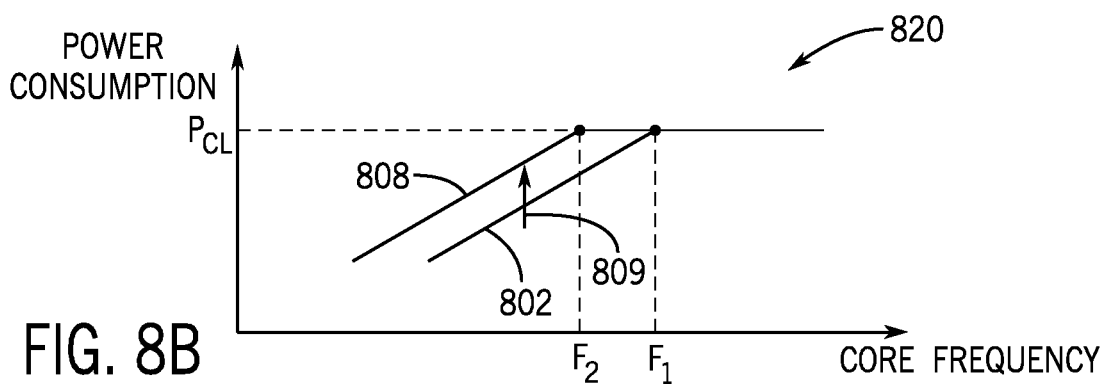

FIG. 8B is an illustration 820 illustrating the use of a positive offset being added to upwardly shift (as depicted by arrow 809) a relationship 802 (having a core operating frequency $F_1$) to establish a new relationship 808 having a core operating frequency $F_2$ less than the original core operating frequency $F_1$.

In a similar manner, in accordance with example implementations, the processor 132 may write to a register 138 to place the PCU 134 in a mode of operation that allows an offset to be added to downwardly or upwardly adjust the un-core operating frequency of the processor 132.

Figure 9:
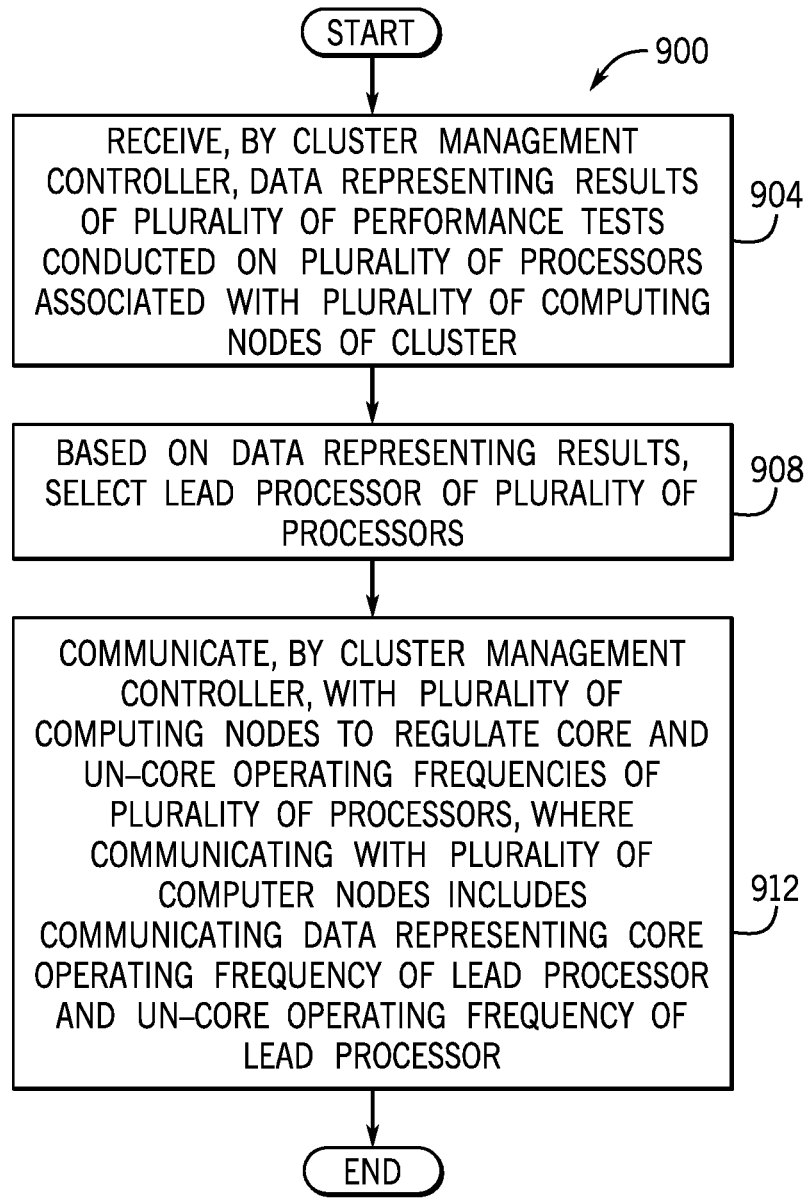
FIG. 9 is a flow diagram depicting a technique to regulate core and un-core operating frequencies of processors associated with computing nodes of a cluster according to an example implementation.

Referring to FIG. 9, a technique 900 includes receiving (block 904), by a cluster management controller, data representing results of a plurality of performance tests that are conducted on a plurality of processors that are associated with the plurality of computing nodes of a cluster. The technique 900 includes, pursuant to block 908, based on the data representing the results, selecting a lead processor of the plurality of processors; and communicating (block 912), by the cluster management controller, with the plurality of computing nodes to regulate core and un-core operating frequencies of the plurality of processors. Communicating with the plurality of computer nodes includes communicating data representing a core operating frequency of the lead processor and an un-core operating frequency of the lead processor.

Figure 10:
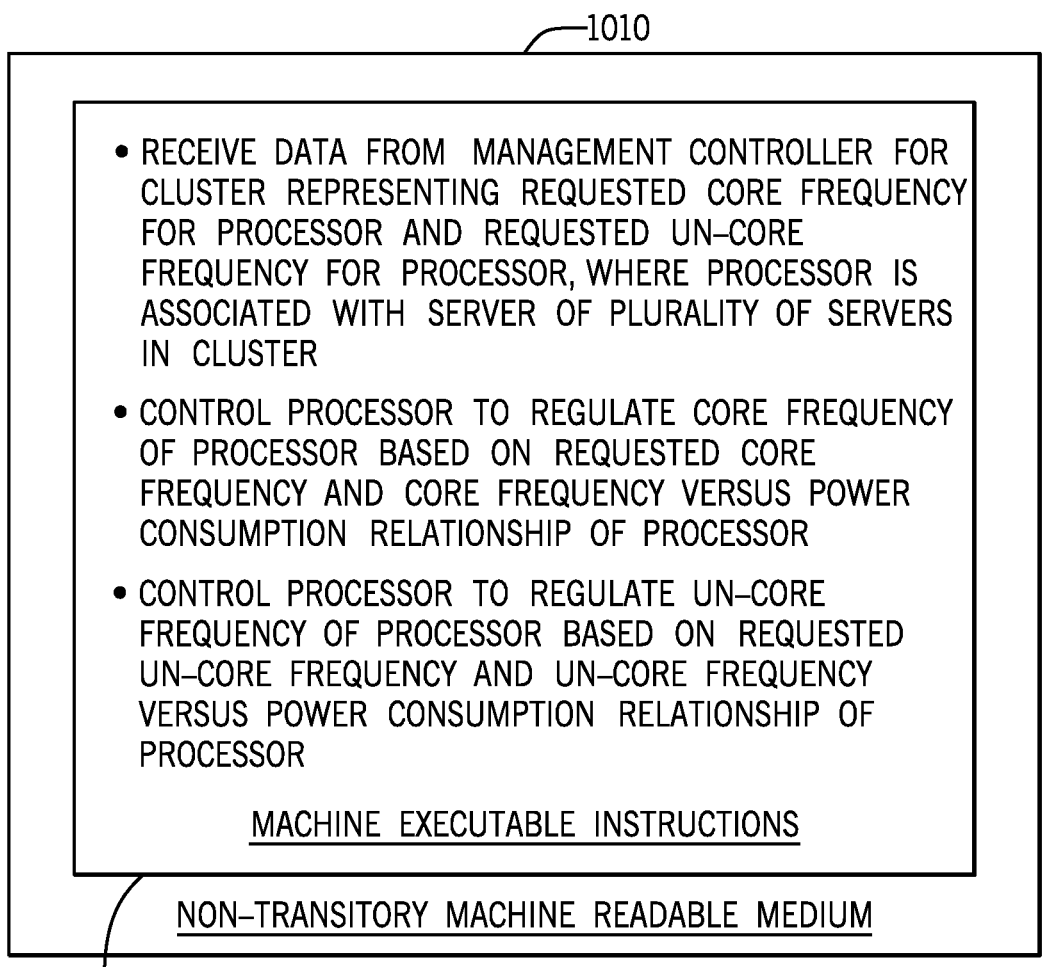
FIG. 10 is an illustration of a non-transitory machine readable storage medium storing instructions that, when executed by a machine, cause the machine to control a processor to regulate core and un-core operating frequencies of the processor according to an example implementation.

Referring to FIG. 10, in accordance with example implementations, a non-transitory machine readable storage medium 1010 stores instructions 1014 to, when executed by a machine, cause the machine to receive data from a management controller for a cluster that represents a requested core operating frequency for a processor and a requested un-core operating frequency for the processor. The processor is associated with a server of a plurality of servers of the cluster. The instructions, when executed by the machine, cause the machine to control the processor to regulate the core operating frequency of the processor based on the requested core operating frequency and the core operating frequency versus power consumption relationship of the processor; and control the processor to regulate the un-core operating frequency of the processor based on the requested un-core operating frequency and an un-core operating frequency versus power consumption relationship of the processor.

Figure 11:
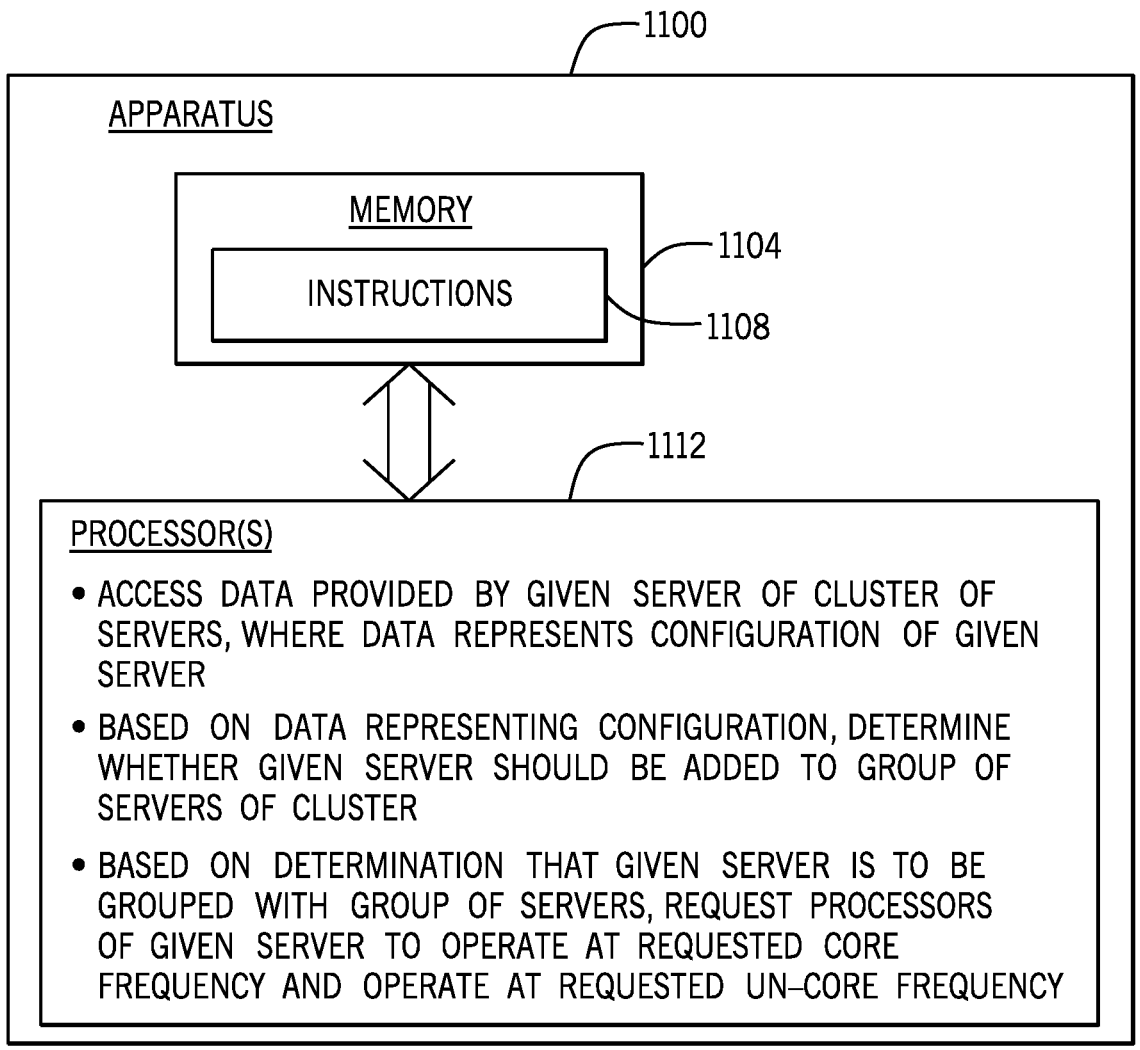
FIG. 11 is a schematic diagram of an apparatus to set processors of a given server to operate at requested core and un-core operating frequencies according to an example implementation.

Referring to FIG. 11, in accordance with example implementations, an apparatus 1100 includes at least one processor 1112 and a memory 1104 to store instructions 1108 that when executed by the processor(s) 112, cause the processor(s) 1112 to access data provided by a given server of a cluster of servers. The data represents a configuration of the given server. The instructions 1108, when executed by the processor(s) 1112, cause the processor(s) 1112 to, based on the data representing the configuration, determine whether the given server should be added to a group of servers of the cluster; and based on the determination that the given server is to be grouped with a group of servers, to request processors of the given server to operate a requested core operation frequency and operate at a requested un-core frequency.

In accordance with example implementations, the data representing the results of the plurality of performance tests includes data representing, for each performance test, an opposed delay to maintain a predetermined performance of the corresponding processor during the performance test.

This has the advantage of allowing the highest performing processor to be selected as the lead processor.

In accordance with example implementations, selecting the lead processor includes selecting the process that is associated with the smallest delay of the delays. This has the advantage of allowing the highest performing processor to be selected as the lead processor.

In accordance with example implementations, communicating with the plurality of computing nodes includes communicating to set the core operating frequencies of the plurality of processors to be essentially the same and set the un-core operating frequencies of the plurality of processors to be essentially the same. A particular advantage of this is that processing among the computing nodes may be more efficient, as processors may coordinate on complicated tasks without having to wait for processors to complete their portions of the task.

In accordance with example implementations, the cluster management controller receives data from each computing node representing an associated tag, where the tag identifies a configuration of the associated computing node. In this manner, the "tag" refers to a label for the data, which associates the data as belonging to a computing node of a particular configuration. Computing nodes may then be grouped based on the tags. A particular advantage of this grouping is that core and un-core operating frequencies may be controlled for a homogeneous group of computing nodes. As described further herein, in accordance with example implementations the "tag" may be a hash value that represents a configuration of the computing node.

In accordance with some implementations, the tags may be hash values. A particular advantage of using hash values is that hash values may be used to efficiently identify whether configurations of computing nodes are the same or different.

In accordance with example implementations, a core operating frequency versus power consumption relationship of the processor and an un-core operating frequency versus power relationship of the processor may be performed as part of a power on self test (POST). A particular advantage of this is that the core and un-core frequencies of the processors of a computing node may be initialized at bootup or reset of the computing node.

In accordance with example implementations, data may be written to at least one register associated with a power control unit of the processor to control a core power consumption versus frequency relationship that is sensed by the power control unit to regulate the core operating frequency of the processor. A particular advantage of this is that the core and un-core operating frequencies may be controlled to be the same across a cluster or group of computing nodes.

In accordance with example implementations, the data written to the register(s) changes a slope of the core power consumption versus frequency relationship or changes an offset of the core power consumption versus frequency relationship. A particular advantage of this is that the core and un-core operating frequencies may be controlled to be the same across a cluster or group of computing nodes.

In accordance with example implementations, data may be written to at least one register associated with a power control unit of the processor to control an un-core power consumption versus frequency relationship that is sensed by the power control unit to regulate the un-core operating frequency of the processor. A particular advantage of this is that the core and un-core operating frequencies may be controlled to be the same across a cluster or group of computing nodes.

In accordance with example implementations, the data written to the register may change a slope of the un-core power consumption versus frequency relationship or change an offset of the un-core power consumption versus frequency relationship. A particular advantage of this is that the core and un-core operating frequencies may be controlled to be the same across a cluster or group of computing nodes.

In accordance with some implementations, a metric may be measured to represent a performance of the processor in connection with a performance test, and data representing the metric may be communicated to a management controller. This has the particular advantage of allowing the core and un-core operating frequencies of the highest performing processor to be selected for all of the processors.

While the present disclosure has been described with respect to a limited number of implementations, those skilled in the art, having the benefit of this disclosure, will appreciate numerous modifications and variations therefrom. It is intended that the appended claims cover all such modifications and variations

What is claimed is:

1. A method comprising:
   receiving, by a cluster management controller, data representing results of a plurality of performance tests conducted on a plurality of processors associated with a plurality of computing nodes of a cluster;
   based on the data representing the results, selecting a lead processor of the plurality of processors; and
   communicating, by the cluster management controller, with the plurality of computing nodes to regulate core and un-core operating frequencies of the plurality of processors, wherein communicating with the plurality of computing nodes comprises communicating data representing a core operating frequency of the lead processor and an un-core operating frequency of the lead processor, and wherein communicating with the plurality of computing nodes to regulate the core and un-core operating frequencies of the plurality of processors comprises communicating with the plurality of computing nodes to set the core operating frequency of each processor of the plurality of processors to be within one percent of the core operating frequency of the lead processor, and set the un-core operating frequency of each processor of the plurality of processors to be within one percent of the un-core operating frequency of the un-core operating frequency of the lead processor.

2. The method of claim 1, wherein the data representing the results of the plurality of performance tests comprises data representing, for each performance test, an imposed delay to maintain a predefined performance of the corresponding processor during the performance test.

3. The method of claim 2, wherein selecting the lead processor comprises selecting the processor of the plurality of processors associated with a smallest imposed delay of the imposed delays.

4. The method of claim 1, further comprising:
   receiving, by the cluster management controller, data from each computing node of the plurality of computing nodes representing an associated tag, wherein the tag identifies a configuration of the associated computing node; and
   grouping computing nodes from a set of computing nodes larger in number than the plurality of computing nodes into a group corresponding to the plurality of computing nodes based on the tags.

5. The method of claim 4, wherein:
the tags comprises hash values; and
grouping the computing nodes comprises excluding a computing node of the set of computing nodes from the group based on the hash value associated with the excluded computing node being different than the hash value of each computing node of the group.

6. A non-transitory machine readable storage medium that stores instructions to, when executed by a machine, cause the machine to:
receive data from a management controller for a cluster representing a requested core operating frequency for a first processor and a requested un-core operating frequency for the first processor, wherein the processor is associated with a server of a plurality of servers of the cluster, the requested core operating frequency comprises a core operating frequency of a lead processor, and the requested un-core operating frequency comprises an un-core operating frequency of the lead processor;
control the first processor to regulate the core operating frequency of the first processor based on the requested core operating frequency and a core operating frequency versus power consumption relationship of the first processor, wherein controlling the processor to regulate the core operating frequency of the first processor comprises setting the core operating frequency of the first processor to be within one percent of the core operating frequency of the lead processor;
control the first processor to regulate the un-core operating frequency of the processor based on the requested un-core operating frequency and an un-core operating frequency versus power consumption relationship of the first processor, wherein controlling the first processor to regulate the un-core operating frequency of the first processor comprises setting the un-core operating frequency of the first processor to be within one percent of the un-core operating frequency of the lead processor.

7. The storage medium of claim 6, wherein the instructions, when executed by the machine, further cause the machine to determine the core operating frequency versus power consumption relationship of the first processor and the un-core operating frequency versus power consumption relationship of the first processor as part of a power on self test (POST) of the machine.

8. The storage medium of claim 6, wherein the instructions, when executed by the machine cause the machine to write data to at least one register associated with a power control unit of the first processor to control a core power consumption versus frequency relationship sensed by the power control unit to regulate the core operating frequency of the first processor.

9. The storage medium of claim 8, wherein the data written to the at least one register changes a slope of the core power consumption versus frequency relationship or changes an offset of the core power consumption versus frequency relationship.

10. The storage medium of claim 6, wherein the instructions, when executed by the machine cause the machine to write data to at least one register associated with a power control unit of the first processor to control an un-core power consumption versus frequency relationship sensed by the power control unit to regulate the un-core operating frequency of the first processor.

11. The storage medium of claim 10, wherein the data written to the at least one register changes a slope of the un-core power consumption versus frequency relationship or changes an offset of the un-core power consumption versus frequency relationship.

12. The storage medium of claim 6, wherein the instructions, when executed by the machine, further cause the machine to measure a metric representing a performance of the first processor in connection with a performance test, and communicate data to the management controller representing the metric.

13. The storage medium of claim 6, wherein the instructions, when executed by the machine, further cause the machine to determine a hash value representing a configuration of the server and communicate the hash value to the management controller.

14. The storage medium of claim 6, wherein the servers execute a distributed application.

15. An apparatus comprising:
at least one processor; and
a memory to store instructions that when executed by the at least one processor cause the at least one processor to:
access data provided by a given server of a cluster of servers, the data representing a configuration of the given server;
based on the data representing the configuration, determine whether the given server should be added to a group of servers of the cluster;
based on the determination that the given server is to be grouped with the group of servers, request processors of the given server to operate at a requested core operating frequency and operate at a requested un-core operating frequency, wherein the requested core operating frequency comprises a core operating frequency of a lead processor for the group of servers, the requested un-core operating frequency comprises an un-core operating frequency of the lead processor, the requesting causes a core operating frequency of each processor of the processors of the given server to be set within one percent of the core operating frequency of the lead processor, and the requesting causes an un-core operating frequency of each processor of the processors of the given server to be set within one percent of the un-core operating frequency of the lead processor.

16. The apparatus of claim 15, wherein
the data comprises a hash value; and
the instructions when executed by the at least one processor further cause the at least one processor to determine whether the given server should be grouped with the group of servers based on a comparison of the hash value to a hash value representing the configuration of each server of the group of servers.

17. The apparatus of claim 15, wherein the instructions when executed by the at least one processor further cause the at least one processor to identify a processor of the group of servers as the lead processor, base the requested core operating frequency on the core operating frequency of the lead processor, and base the un-core operating frequency on the un-core operating frequency of the lead processor.

* * * * *